(12) United States Patent
Chang et al.

(10) Patent No.: US 7,765,463 B2
(45) Date of Patent: *Jul. 27, 2010

(54) SYSTEM AND METHOD FOR AUTHORING MULTIMEDIA CONTENTS DESCRIPTION METADATA

(75) Inventors: Hyun Sung Chang, Daejeon (KR); Seung Jun Yang, Suncheon (KR); Kyeongok Kang, Daejeon (KR); Jinwoong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 759 days.

This patent is subject to a terminal disclaimer.

(21) Appl. No.: 11/657,918

(22) Filed: Jan. 24, 2007

(65) Prior Publication Data

US 2007/0118554 A1    May 24, 2007

Related U.S. Application Data

(63) Continuation of application No. 10/741,843, filed on Dec. 19, 2003, now Pat. No. 7,234,104.

(30) Foreign Application Priority Data

Dec. 20, 2002    (KR) .......................... 2002-0081682

(51) Int. Cl.
*G06F 17/21*    (2006.01)
(52) U.S. Cl. ..................................... 715/202
(58) Field of Classification Search ............. 715/230, 715/202
See application file for complete search history.

(56) References Cited

U.S. PATENT DOCUMENTS 6,426,778 B1 *   7/2002   Valdez, Jr. .................. 348/461
6,549,922 B1 *   4/2003   Srivastava et al. ........... 707/205
6,741,996 B1 *   5/2004   Brechner et al. ............. 707/102
6,925,474 B2 *   8/2005   McGrath et al. ......... 707/104.1

(Continued)

FOREIGN PATENT DOCUMENTS

EP    0596823    10/1993

(Continued)

OTHER PUBLICATIONS

Lugeon, et al., "Informative Report on the Development of an MPEG-7 Visual Annotation Tool," May 31 through Jun. 1, 2000, IBM Watson Research Center, pp. 1-12.*

*Primary Examiner*—Doug Hutton
*Assistant Examiner*—Frank D Mills
(74) *Attorney, Agent, or Firm*—Blakely, Sokoloff, Taylor & Zafman LLP

(57) ABSTRACT

Disclosed is a system for authoring metadata that describe multimedia contents. A storage device loads information on a currently edited metadata document so as to describe multimedia contents, and a metadata editor visualizes the loaded metadata document according to a predetermined method, and allows a user to edit the metadata document. A multimedia access reproducer accesses the input multimedia contents to reproduce corresponding multimedia contents, and an inter-media metadata interface links the multimedia access reproducer and the metadata editor to browse contents and effectively edit information relating to a specific interval of multimedia contents. A metadata output device outputs information on the loaded metadata document according to a predefined format.

10 Claims, 2 Drawing Sheets

U.S. PATENT DOCUMENTS

| | | | |
|---|---|---|---|
| 6,956,593 B1 * | 10/2005 | Gupta et al. | 715/751 |
| 6,959,326 B1 * | 10/2005 | Day et al. | 709/217 |
| 7,032,177 B2 * | 4/2006 | Novak et al. | 715/723 |
| 2001/0018693 A1 * | 8/2001 | Jain et al. | 707/500 |
| 2002/0069218 A1 * | 6/2002 | Sull et al. | 707/501.1 |
| 2002/0099696 A1 * | 7/2002 | Prince | 707/3 |
| 2002/0099731 A1 * | 7/2002 | Abajian | 707/500 |
| 2002/0099737 A1 * | 7/2002 | Porter et al. | 707/513 |
| 2002/0107973 A1 * | 8/2002 | Lennon et al. | 709/231 |
| 2002/0120634 A1 * | 8/2002 | Min et al. | 707/200 |
| 2002/0120925 A1 * | 8/2002 | Logan | 725/9 |
| 2002/0152267 A1 * | 10/2002 | Lennon | 709/203 |
| 2002/0188621 A1 * | 12/2002 | Flank et al. | 707/104.1 |
| 2003/0142124 A1 | 7/2003 | Takata et al. | |
| 2003/0182315 A1 * | 9/2003 | Plastina et al. | 707/200 |
| 2003/0193994 A1 * | 10/2003 | Stickler | 375/150 |
| 2003/0233349 A1 * | 12/2003 | Stern et al. | 707/3 |
| 2004/0002993 A1 * | 1/2004 | Toussaint et al. | 707/104.1 |
| 2004/0004631 A1 * | 1/2004 | Debique et al. | 345/704 |
| 2004/0006744 A1 * | 1/2004 | Jones et al. | 715/514 |
| 2004/0085342 A1 * | 5/2004 | Williams et al. | 345/723 |
| 2004/0098398 A1 * | 5/2004 | Ahn et al. | 707/100 |
| 2005/0038809 A1 | 2/2005 | Abajian et al. | |
| 2005/0060741 A1 | 3/2005 | Tsutsui et al. | |
| 2005/0081159 A1 | 4/2005 | Gupta et al. | |
| 2005/0193014 A1 | 9/2005 | Prince | |

FOREIGN PATENT DOCUMENTS

| | | |
|---|---|---|
| KR | 2001-0007692 | 2/2001 |
| WO | WO 01-69438 | 9/2001 |
| WO | WO 02-16596 | 2/2002 |

* cited by examiner

SYSTEM AND METHOD FOR AUTHORING MULTIMEDIA CONTENTS DESCRIPTION METADATA

This application is a continuation of U.S. application Ser. No. 10/741,843 titled "System And Method For Authoring Multimedia Contents Description Metadata," filed Dec. 19, 2003 now U.S. Pat. No. 7,234,104, which claims priority to and the benefit of Korea Patent Application No. 2002-81682 filed on Dec. 20, 2002 in the Korean Intellectual Property Office, the content of which is incorporated herein by reference.

BACKGROUND OF THE INVENTION

1. Field of the Invention

The present invention relates to a system and method for authoring multimedia contents description metadata. More specifically, the present invention relates to a system and method for effectively authoring multimedia contents description metadata through visualization of the metadata and linkage with the multimedia contents.

2. Description of the Related Art

Metadata for multimedia content is used to manage, retrieve, and browse huge amounts of multimedia content in multimedia environments including digital broadcasts and the Internet. A system for efficiently authoring the metadata that describes multimedia content is required so as to use the metadata in the above-noted multimedia environments.

However, since the conventional metadata authoring system does not aim at describing multimedia contents, the metadata authoring system does not consider linkage with the multimedia contents, and recent authoring development states in consideration of the linkage focus on the metadata components directly linked with contents according to a specific method.

Hence, the conventional metadata authoring system has difficulty in visualizing

SUMMARY OF THE INVENTION

It is an advantage of the present invention to provide a metadata authoring system and method for linking various types of metadata information on multimedia contents with multimedia data, and editing the same.

In one aspect of the present invention, a system for authoring metadata for describing multimedia contents comprises: a storage device for loading information of a currently authored metadata document so as to describe input multimedia contents; a metadata editor for visualizing the loaded metadata document according to a predetermined method, and allowing a user to edit the metadata document; a multimedia access reproducer for accessing the input multimedia contents, and reproducing the corresponding multimedia contents; an inter-media metadata interface for linking the multimedia access reproducer and the metadata editor, and allowing to browse contents and effectively edit information that relates to a specific interval of multimedia data; and a metadata output device for outputting the loaded metadata document information according to a predefined format when the authoring is finished.

In another aspect of the present invention, a method for authoring metadata for describing multimedia contents comprises: (a) loading information on a metadata document of earlier authoring so as to describe input multimedia contents; (b) visualizing the metadata document loaded in the storage device according to a predetermined method; and (c) allowing a user to use the visualized metadata document and edit the metadata document in linkage with the corresponding multimedia contents.

In still another aspect of the present invention, a recording medium for storing a software program for authoring metadata for describing multimedia contents comprises: a metadata editing module for visualizing a metadata document loaded in a storage device according to a predetermined method, and allowing a user to edit the metadata document; a multimedia access reproducing module for accessing the input multimedia contents and reproducing corresponding multimedia contents; an inter-media metadata interface module for linking the multimedia access reproducing module and the metadata editing module to browse contents and effectively edit information relating to a specific interval of the multimedia contents; and a metadata output module for outputting metadata document information loaded in the storage device according to a predefined format when the authoring is finished.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
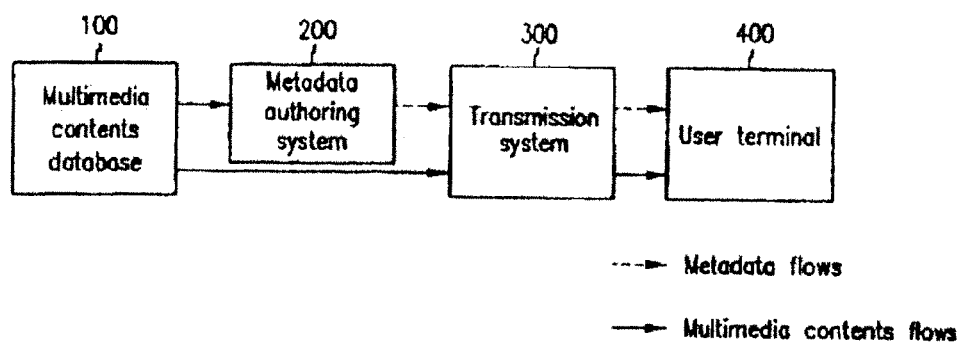
FIG. 1 shows a configuration diagram of a multimedia service environment for using the multimedia contents description metadata according to a preferred embodiment of the present invention.

FIG. 1 shows a whole configured system of a multimedia service environment for using the multimedia contents description metadata according to a preferred embodiment of the present invention.

As shown, the multimedia system comprises a multimedia contents database 100, a metadata authoring system 200, a transmission system 300, and a user terminal 400.

The metadata authoring system 200 receives multimedia contents from the multimedia contents database 100 or another system, authors multimedia contents description metadata, and transmits them to the transmission system 300. In this instance, the multimedia contents description metadata include program information, temporal segment information, summary configuration information, and annotation information of the multimedia contents.

The transmission system 300 transmits the multimedia data authored by the metadata authoring system 200 to the user terminal 400 by using an appropriate protocol according to a specific transmission environment such as a broadcast or the Internet.

The use1r terminal 400 displays the multimedia contents transmitted through the transmission system 300 to the user, and supports the user so that he may view a summary of the multimedia contents or retrieve desired segments to view desired portions by using the metadata information transmitted together with the multimedia contents.

Figure 2:
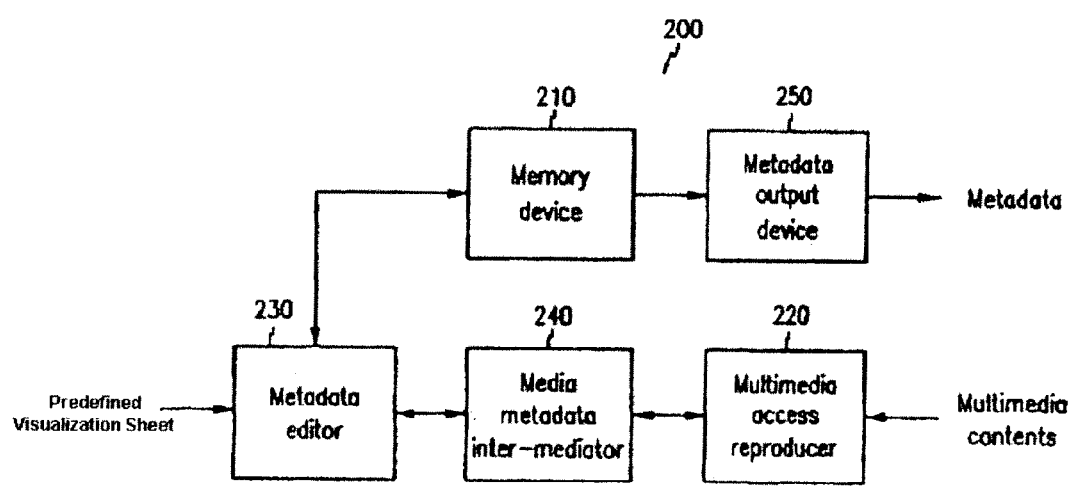
FIG. 2 shows a detailed block diagram of a multimedia contents description metadata authoring system according to a preferred embodiment of the present invention.

FIG. 2 shows a detailed multimedia contents description metadata authoring system according to a preferred embodiment of the present invention.

As shown, the metadata authoring system comprises a storage device 210, a multimedia access reproducer 220, a metadata editor 230, an inter-media-metadata interface 240, and a metadata output device 250.

The storage device 210 stores information on the metadata documents which are currently authored.

The multimedia access reproducer 220 receives multimedia contents to which a metadata authoring process will be applied, and accesses a specific interval of the multimedia contents, or reproduces the multimedia contents.

The metadata editor 230 refers to the metadata documents loaded in the storage device 210, visualizes the metadata documents according to a predefined rule, and edits the corresponding contents by receiving the user's inputs.

For example, the metadata editor 230 places the metadata information on a sheet/page (for visualization) that is defined by HTML (hyper text markup language) and a plurality of command objects which can be inserted into the HTML. When the user edits the contents of the page, the metadata editor 230 receives instructions on the contents edited by using the command objects, and modifies the corresponding portion of the metadata document loaded in the storage device 210. The metadata author uses a predefined sheet/page (for visualization) and makes the visualization sheet, or selects one of the previously made visualization sheets according to personal preference.

The metadata editor 230 has a user interface for visualizing the time axis on the multimedia contents, and when the contents of metadata relate to a specific interval of the multimedia contents, the metadata editor 230 represents the contents on the time axis of the multimedia contents.

The inter-media-metadata interface 240 interfaces between the multimedia access reproducer 220 and the metadata editor 230 to allow the multimedia access reproducer 220 to browse multimedia contents by using the metadata currently edited by the metadata editor 230. In detail, when the contents of the metadata currently edited by the metadata editor 230 are related to a specific interval of the multimedia contents, the inter-media-metadata interface 240 allows the multimedia access reproducer 220 to access the corresponding interval of the multimedia contents, and reproduce the multimedia contents.

Also, the inter-media-metadata interface 240 allows to select a specific interval of the multimedia contents through a visualized user interface of the multimedia contents on the time axis, and to input metadata information that relates to the specific interval.

The metadata output device 250 outputs finally edited metadata information stored in the storage device 210 according to a predefined format when authoring the metadata is finished. The format of the output metadata can be represented by the XML (extensible markup language) according to the national and international standards for multimedia contents description, and the metadata can be output in the binary format defined by the national and international standards by further compressing the XML.

The metadata editor 230, the inter-media-metadata interface 240, the multimedia access reproducer 220, and the metadata output device 250 can be realized as software modules or hardware units.

Figure 3:
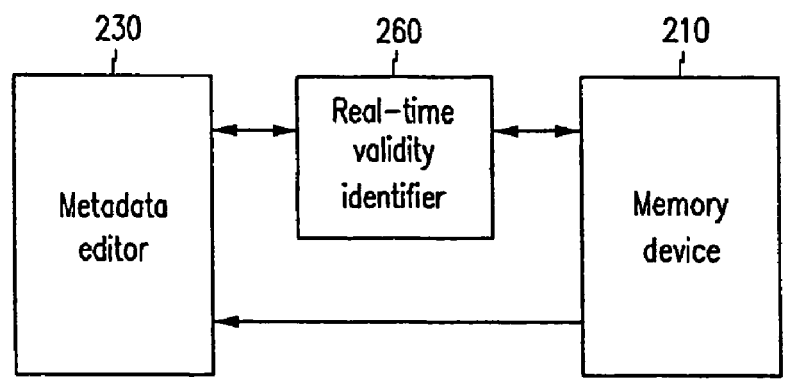
FIG. 3 shows an extended diagram for the multimedia contents description metadata authoring system of FIG. 2 to identify validity in real-time according to editing the metadata.

FIG. 3 shows an extended diagram of an interface between the storage device 210 and the metadata editor 230 shown in FIG. 2.

When an event of editing the contents of the metadata is generated by the user through the metadata editor 230, a real-time validity identifier 260 refers to metadata schema information on the edited components to check whether editing results are valid. When the editing results are found to be valid, the real-time validity identifier 260 changes metadata information loaded in the storage device, and when they are not valid, the real-time validity identifier 260 notifies the user with an appropriate error message through the metadata editor 230.

The metadata schema information can be stored as a separately described document format, and loaded in the storage device 210 according to a selection by the user.

Figure 4:
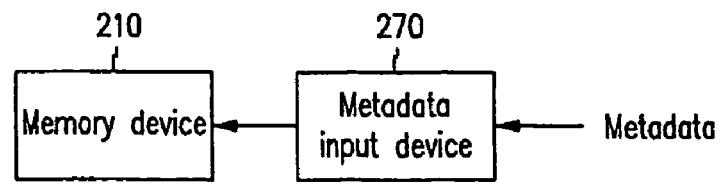
FIG. 4 shows an extended diagram for the multimedia contents description metadata authoring system of FIG. 2 to re-edit the conventionally authored metadata.

FIG. 4 shows an extended diagram for the multimedia contents description metadata authoring system of FIG. 2 to re-edit the conventionally authored metadata.

As shown, a metadata input device 270 identifies validity of the metadata input for re-editing, and loads the identified metadata information in the storage device 210. When an invalid portion is found after identifying the validity, the metadata input device 270 extracts the valid portion and loads the same in the storage device.

According to the present invention, the multimedia contents description metadata are effectively authored since various types of metadata information on the multimedia contents can be edited while being linked with the multimedia data.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A system for authoring metadata for describing multimedia contents, comprising:
   a storage device for loading a metadata document that describes corresponding multimedia contents;
   a metadata editor for displaying the loaded metadata document according to a predetermined method, and allowing a user to edit the metadata document;
   a multimedia access reproducer for accessing and reproducing the corresponding multimedia contents;
   an inter-media metadata interface for linking the multimedia access reproducer and the metadata editor and allowing the user to browse the multimedia contents and effectively edit a portion of the metadata document that relates to a specific interval of the multimedia contents;
   a metadata output device for outputting the edited metadata document according to a predefined format when the authoring is finished; wherein the storage device loads metadata schema information, and a metadata input device extracts valid portions and loads the valid portions into the storage device when invalid portions are found after checking the validity of the metadata document.

2. The system of claim 1, further comprising a real-time validity checker for referring to the metadata schema information for the edited metadata document to check whether the edits made by the user are valid.

3. The system of claim 1, wherein the metadata schema information is stored separately from the metadata document in a separate document and is loaded into the storage device via a selection by the user.

4. The system of claim 1, wherein the metadata input device operates to edit a previously authored metadata document.

5. The system of claim 4, wherein the metadata input device checks the validity of the metadata document, and loads the metadata document into the storage device.

6. The system of claim 1, wherein the metadata editor displays metadata from the metadata document in a predefined visualization sheet and the multimedia access reproducer accesses a specific portion of the metadata document and reproduces the multimedia contents that relates to the portion through the inter-media metadata interface.

7. The system of claim 6, wherein the visualization sheet is separately generated by an author, or selected by the user from among a plurality of previously generated visualization sheets.

8. The system of claim 6, wherein the metadata editor displays the visualization sheet in HTML and the system further comprises a real-time validity checker for notifying the user when the edits made by the user are invalid.

9. The system of claim 6, wherein the metadata editor includes a user interface for displaying a time axis for the multimedia contents, and allows the user to select the specific interval through the user interface and input metadata relating to the selected interval.

10. The system of claim 1, wherein the format of the metadata output through the metadata output device is XML (extensible markup language).

* * * * *